(12) United States Patent
Kim et al.

(10) Patent No.: US 9,426,481 B2
(45) Date of Patent: Aug. 23, 2016

(54) METHOD AND APPARATUS FOR ENCODING IMAGE, AND METHOD AND APPARATUS FOR DECODING IMAGE

(75) Inventors: Seung-gu Kim, Seoul (KR);
Geon-hyoung Lee, Suwon-si (KR);
Se-hyeok Park, Seoul (KR);
Tae-gyoung Ahn, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 867 days.

(21) Appl. No.: 13/594,953

(22) Filed: Aug. 27, 2012

(65) Prior Publication Data
US 2013/0051474 A1    Feb. 28, 2013

(30) Foreign Application Priority Data
Aug. 25, 2011   (KR) .................. 10-2011-0085147

(51) Int. Cl.
| | | |
|---|---|---|
| H04N 19/182 | (2014.01) | |
| H04N 19/42 | (2014.01) | |
| H04N 19/50 | (2014.01) | |
| H04N 19/132 | (2014.01) | |
| H04N 19/426 | (2014.01) | |
| H04N 19/167 | (2014.01) | |
| H04N 19/124 | (2014.01) | |
| H04N 19/34 | (2014.01) | |

(52) U.S. Cl.
CPC .......... *H04N 19/428* (2014.11); *H04N 19/132* (2014.11); *H04N 19/167* (2014.11); *H04N 19/182* (2014.11); *H04N 19/124* (2014.11); *H04N 19/34* (2014.11); *H04N 19/50* (2014.11)

(58) Field of Classification Search
None
See application file for complete search history.

(56) References Cited

U.S. PATENT DOCUMENTS

| | | | | |
|---|---|---|---|---|
| 4,562,467 A * | 12/1985 | Bradley | ............... | H04N 19/593 375/240.12 |
| 5,612,746 A * | 3/1997 | Slavin | ................... | H04N 19/51 375/240.24 |
| 6,078,619 A * | 6/2000 | Monro | ................. | H04N 19/503 375/240 |
| 8,443,275 B2 * | 5/2013 | Gupte | .............. | H04N 19/00763 714/799 |
| 8,705,623 B2 * | 4/2014 | Chen | ................ | H04N 19/00763 375/240.12 |
| 2005/0012759 A1 | 1/2005 | Valmiki et al. | | |
| 2008/0253758 A1 | 10/2008 | Yap et al. | | |
| 2009/0097561 A1 * | 4/2009 | Chiu | ....................... | H04N 19/30 375/240.16 |
| 2009/0122862 A1 * | 5/2009 | Huguenel | .............. | H04N 19/60 375/240.03 |
| 2010/0231688 A1 | 9/2010 | Park et al. | | |

* cited by examiner

*Primary Examiner* — William C Vaughn, Jr.
*Assistant Examiner* — Lindsay Uhl
(74) *Attorney, Agent, or Firm* — Sughrue Mion, PLLC

(57) ABSTRACT

A method and apparatus for encoding an image, and a method and apparatus for decoding an image. The method of encoding an image includes: classifying pixels forming an input image into a first pixel group in which bit depth of original pixel values is maintained, and a second pixel group in which bit depth of original pixel values is changed; generating a changed input image by changing the bit depth of pixel values of pixels in the second pixel group; and performing motion prediction and compensation on the changed input image.

17 Claims, 13 Drawing Sheets

MODE INFORMATION : 00

MODE INFORMATION : 01

MODE INFORMATION : 10

MODE INFORMATION : 11

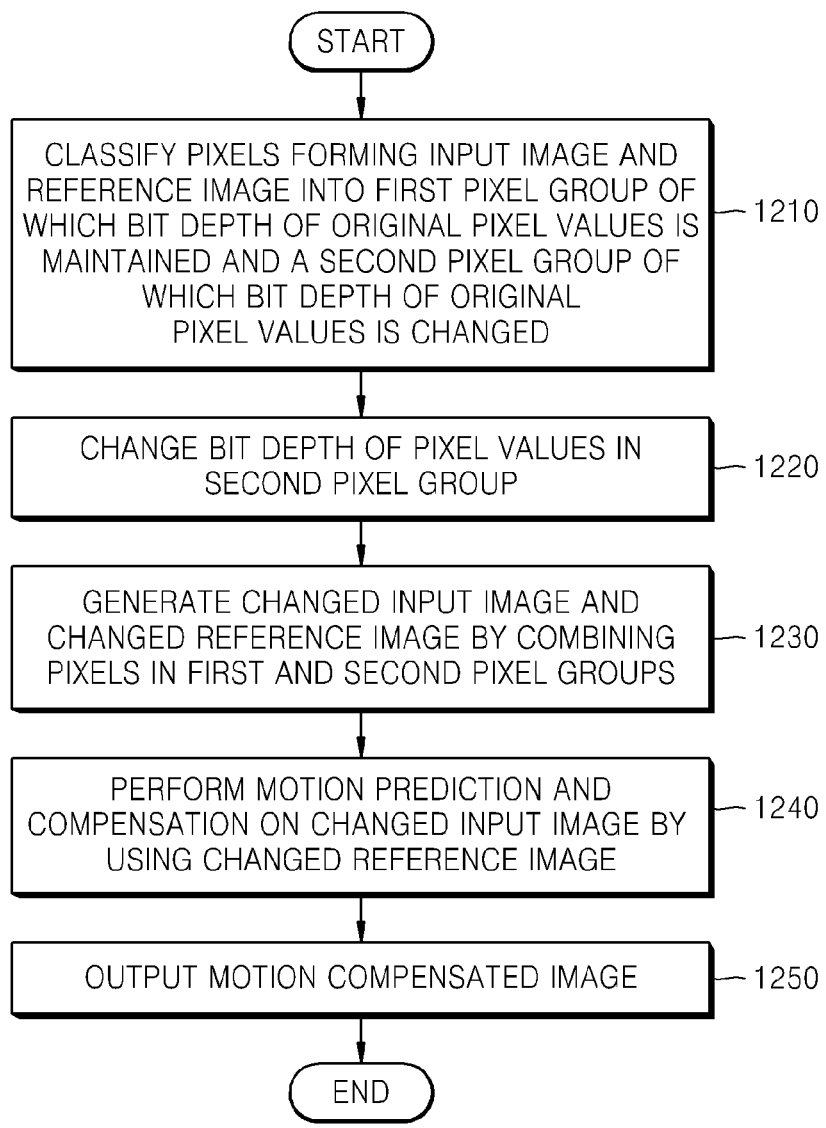

METHOD AND APPARATUS FOR ENCODING IMAGE, AND METHOD AND APPARATUS FOR DECODING IMAGE

CROSS-REFERENCE TO RELATED PATENT APPLICATION

This application claims the benefit of Korean Patent Application No. 10-2011-0085147, filed on Aug. 25, 2011, in the Korean Intellectual Property Office, the disclosure of which is incorporated herein in its entirety by reference.

BACKGROUND

1. Field

Apparatuses and methods consistent with exemplary embodiments relate to encoding and decoding of an image, and more particularly, to a method and apparatus for performing motion prediction and compensation by changing a bit depth of pixel values of pixels forming an image.

2. Description of the Related Art

The need for a video codec and image processing apparatus that effectively encodes and decodes high resolution or high quality image content is increasing as a consequence of the development and increasing availability of the supply of hardware capable of reproducing and storing such content. High resolution image content, however, increases the amount of data to be processed, the time required to process the data, and the required amount of hardware resources. Notwithstanding the foregoing, it is yet important while processing high resolution image data, to reduce to the extent possible the amount of data, the time required to process the data, and the required amount of hardware resources.

SUMMARY

One or more exemplary embodiments may overcome the above disadvantages and other disadvantages not described above. However, it is understood that one or more exemplary embodiment are not required to overcome the disadvantages described above, and may not overcome any of the problems described above. The exemplary embodiments include a method and apparatus for encoding an image, and a method and apparatus for decoding an image, wherein an error between an original image and a high resolution image is reduced by effectively processing the high resolution image, while an amount of data to be processed while processing the high resolution image, a process time, and required hardware resources are reduced.

The exemplary embodiments also include an apparatus for processing an image, which outputs such a processed high resolution image.

According to an aspect of an exemplary embodiment there is provided a method of encoding an image, the method comprising: classifying pixels of an input image into a first pixel group in which the bit depth is maintained, and a second pixel group in which the bit depth is changed; changing the bit depth of the second group pixels; generating a changed input image by using the pixels in the first pixel group and also the pixels in the second group, of which the bit depth has been changed; and performing motion prediction and compensation on the changed input image.

According to an another aspect of an exemplary embodiment there is provided a method of encoding an image, the method comprising: classifying pixels of an input image and of a reference image into a first pixel group in which the bit depth is maintained, and a second pixel group in which the bit depth is changed; changing the bit depth of the second group pixels; generating a changed input image and a changed reference image by using the pixels in the first pixel group and also the pixels in the second pixel group, of which the bit depth has been changed; and performing motion prediction and compensation on the changed input image by using the changed reference image.

According to an another aspect of an exemplary embodiment there is provided an apparatus for encoding an image, the apparatus comprising: a bit depth changing unit for classifying pixels of an input image into a first pixel group in which the bit depth is maintained, and a second pixel group in which the bit depth is changed, and changing the bit depth of second group pixels; a storage unit for storing a reference image used for motion prediction; a motion prediction unit for generating a motion vector by performing motion prediction by using the reference image and a changed input image generated by combining the pixels in the first pixel group and the pixels in the second pixel group; and a motion compensation unit for extracting a corresponding region of the reference image based on the motion vector.

According to an another aspect of an exemplary embodiment there is provided an apparatus for encoding an image, the apparatus comprising: a bit depth changing unit for classifying pixels of an input image and of a reference image into a first pixel group in which the bit depth is maintained, and a second pixel group in which the bit depth is changed, and changing the bit depth of the second group pixels; a motion prediction unit for generating a motion vector by performing motion prediction using a changed input image and a changed reference image obtained by combining the pixels in the first pixel group and the pixels in the second pixel group; a storage unit for storing the changed reference image and the reference image; and a motion compensation unit for extracting a corresponding region of the reference image based on the motion vector.

According to an another aspect of an exemplary embodiment there is provided a method of decoding an image, the method comprising: restoring a motion vector and residual information of a current image decoded from a received bitstream; generating a prediction image of the current image by extracting a corresponding region of a reference image stored in a storage device, wherein the reference image is pre-restored using the restored motion vector; and restoring the current image by using the prediction image and the residual information, wherein the reference image is divided into blocks having a predetermined size, stored in the storage device with at least one pixel value of a pixel selected from among pixels of each block, a difference value between the selected pixel and remaining pixels of the block, and information about a location of the selected pixel, and restored by using pixel information about each block when read from the predetermined storage device.

According to an another aspect of an exemplary embodiment there is provided an apparatus for decoding an image, the apparatus comprising: an entropy decoding unit which restores a motion vector and residual information of a current image decoded from a received bitstream; a storage unit which stores a pre-restored reference image; a motion compensation unit which generates a prediction image of the current image by extracting a corresponding region of the pre-restored reference image by using the restored motion vector; and an adding unit which restores the current image by using the prediction image and the residual information, wherein the pre-restored reference image is divided into blocks having a predetermined size, stored in the storage device by using at least one pixel value of a pixel selected from among pixels of each block, a difference value between the selected pixel and remaining pixels, and information about a location of the selected pixel, and restored by using pixel information about each block when read from the storage device.

According to an another aspect of an exemplary embodiment there is provided an image encoding method, comprising: dividing an input image into blocks of pixels; for each of the pixel blocks, selecting at least one pixel for output at an unmodified bit depth; in each block, reducing the bit depth of the non-selected pixels; outputting, as a bitstream, a combination of the identified pixels at the unmodified bit depth and the non-selected pixels at the reduced bit depth.

BRIEF DESCRIPTION OF THE DRAWINGS

The foregoing will become more apparent by describing in detail exemplary embodiments thereof with reference to the attached drawings in which:

FIG. 12 is a flowchart illustrating a method of processing an image, according to an exemplary embodiment.

DETAILED DESCRIPTION

Figure 1A:
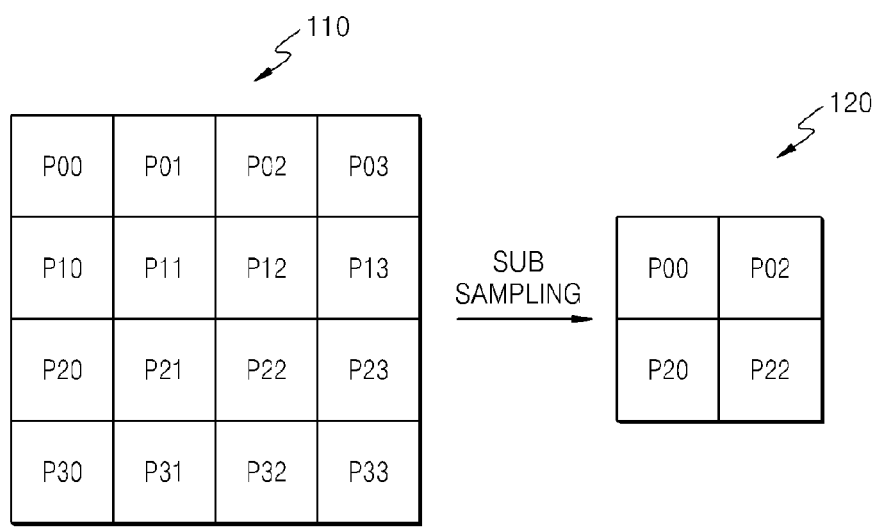
FIGS. 1A and 1B are reference diagrams for describing a method of processing data of an image in a related conventional technology field.
Figure 1B:
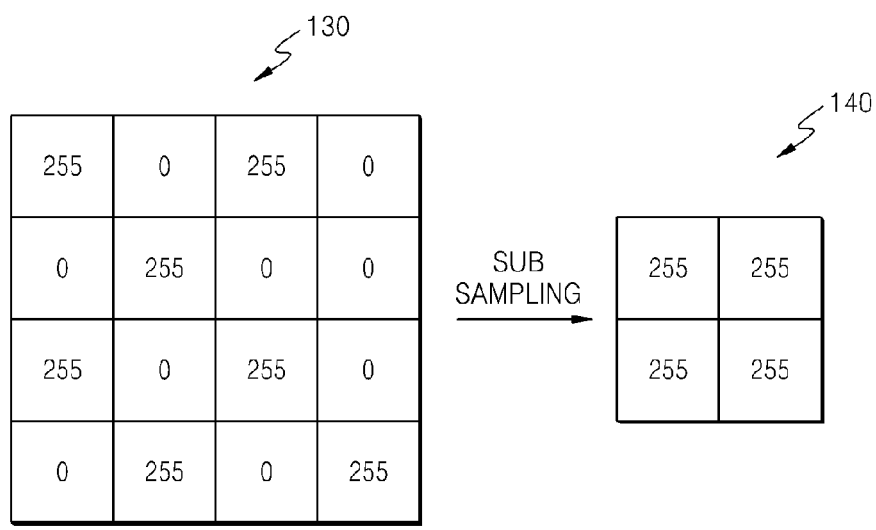

FIGS. 1A and 1B are reference diagrams for describing a method of processing data of an image in a related conventional technology field.

In this field, there is a method of scaling an image to be processed by using a band-pass filter and sub-sampling as a pre-processing operation for reducing an image data amount. For example, referring to FIG. 1A, a 2×2 image 120 including 4 pixels is generated by sub sampling a 4×4 image 110 that has 16 pixels P00 through P33. Afterward, the 2×2 image 120 is processed instead of the 4×4 image 110, thereby reducing the amount of data that has to be processed. However, according to this sub sampling approach, the image characteristics of original image data are lost, and an encoding error may occur during the image process an image processed in the manner described above. For example, as shown in FIG. 1B, when a 4×4 image 130, in which pixels having values of 0 and 255 form a checkerboard pattern with each other, is processed via the sub sampling approach of FIG. 1A, a 2×2 image 140 including the pixels all having the value of 255 is generated. Since the 2×2 image 140, as generated, has image characteristics different from those of the 4×4 image 130, the accuracy of a motion prediction result may be remarkably reduced when an image process, such as motion prediction, is performed on the 2×2 image 140 instead of the 4×4 image 130 so as to reduce a data amount to be processed.

Accordingly, in view of the foregoing points, the exemplary embodiments generate a changed input image in which a number of bits is reduced by reducing a bit depth of only some pixels of an input image to be processed, and perform motion prediction and compensation by using the thus-changed input image. Accordingly, the amount of data to be processed is reduced, without having to remarkably reduce the image characteristics of the original image.

Figure 2:
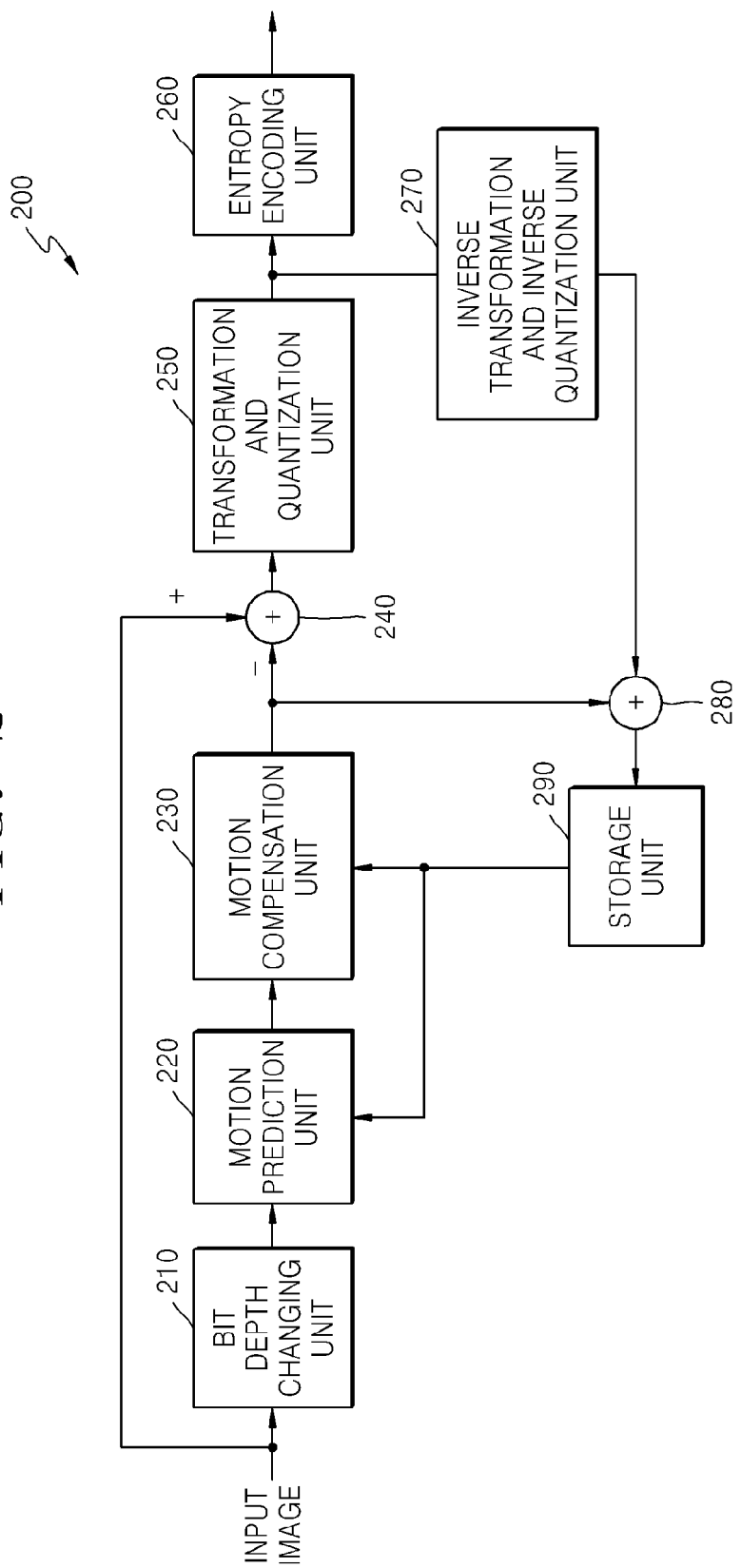
FIG. 2 is a block diagram of an apparatus for encoding an image, according to an exemplary embodiment.

FIG. 2 is a block diagram of an apparatus 200 for encoding an image, according to an exemplary embodiment.

Referring to FIG. 2, the apparatus 200 according to an exemplary embodiment includes a bit depth changing unit 210, a motion prediction unit 220, a motion compensation unit 230, a subtracting unit 240, a transformation and quantization unit 250, an entropy encoding unit 260, an inverse transformation and inverse quantization unit 270, an adding unit 280, and a storage unit 290.

The bit depth changing unit 210 generates a changed input image by changing a bit depth of some of the pixels of the pixels that form the input image. In detail, the bit depth changing unit 210 classifies the pixels that form the input image into a first pixel group, in which the bit depth of the original pixel values is maintained, and into a second pixel group in which the bit depth of original pixel values is changed, and generates the changed input image by changing only the bit depth of the pixel values of the pixels in the second pixel group. The image quality is affected by the number of bits that express the image data value. As the bit depth indicating accuracy of image data, i.e., the number of bits expressing the image data value, is increased, the data may be expressed in more and various levels. For example, when one pixel has a bit depth of 8 bits, the pixel may express values in 256 levels from 0 to 255. Higher bit depth increases the capacity of the entire image data to be processed. However, when the data capacity is decreased via sub sampling as previously described, a prediction error may occur. Accordingly, the apparatus 200 according to the exemplary embodiment reduces the bit depth of only some of the pixels selected from the pixels that make up the input image, thereby reducing the amount of data to be processed while maintaining to the extent possible the image characteristics of the original image data.

Figure 3A:
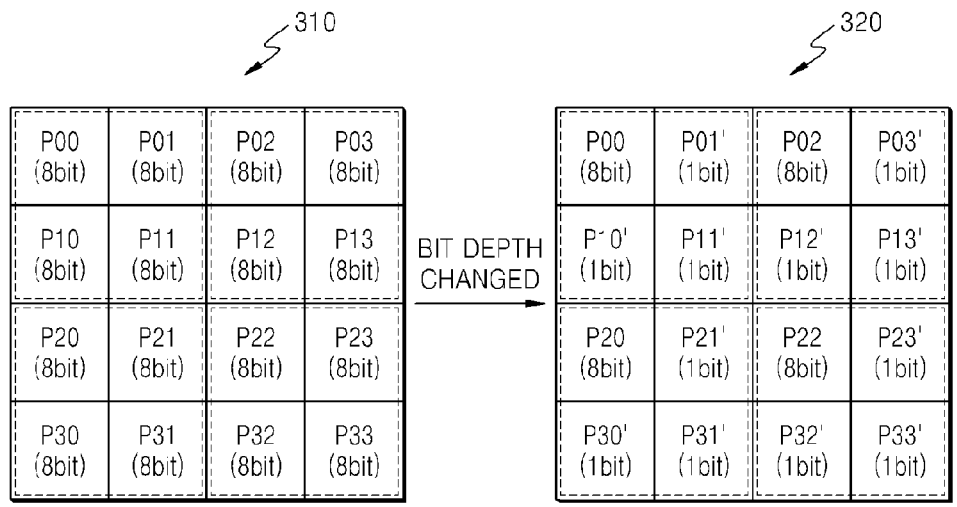
FIGS. 3A and 3B are reference diagrams for describing a method of changing a bit depth of some pixels in original image data, according to an exemplary embodiment.
Figure 3B:
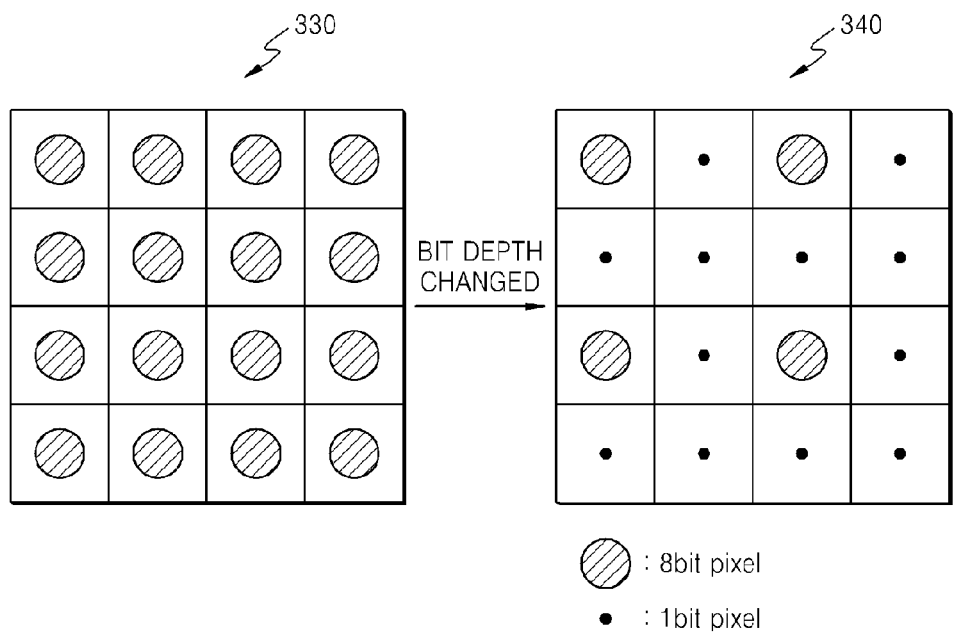

FIGS. 3A and 3B are reference diagrams for describing a method of changing the bit depth of only some of the pixels in the original image data, according to an exemplary embodiment.

Referring to FIG. 3A, the bit depth changing unit 210 reduces the bit depth of some of the pixels of the original image data. In detail, the bit depth changing unit 210 may (1) divide the original image data into blocks having a predetermined size, (2) classify the pixels at certain locations in the blocks as belonging to a first pixel group (of which the bit depth is not changed) with the remaining pixels which don't belong to the first pixel group being classified as belonging to a second pixel group, and (3) reduce the bit depths of the pixels in the first pixel group, thereby reducing the overall image data amount. For example, in FIG. 3A, 16 pixels 310 are divided into 2×2 blocks, P00, P02, P20, and P22, which are the upper left pixels from among the pixels in the 2×2 blocks, are classified as the first pixel group. For the pixels of the first group, the original bit depth of 8 bits of is maintained. The remaining pixels which are not in the first pixel group are classified as the second pixel group. For the pixels of the second group, the bit depth is reduced from 8 bits to 1 bit. The 16 pixels 310 have an original data amount of 8 bits×16=128 bits. After the bit depth of the pixels in the second group is reduced, the 16 pixels 320 have a total data amount of 44 bits.

FIG. 3B graphically illustrates this change of bit depth corresponding to the sets of pixels as shown in FIG. 3A. One notable difference between the approach reflected in FIGS. 1A and 1B, and the approach in FIGS. 3A and 3B is that the latter conveys information about all of the pixels. The amount of data to be processed is yet reduced compared to the original amount, while the characteristics of the original image data are better maintained, within a predetermined range, as much as possible.

Meanwhile, according to the current embodiment, the bit depth of second group pixel values is changed to 1 bit, but the changed bit depth is not limited to just one bit, so long as the changed bit depth is smaller than the original bit depth. In other words, when the original pixel bit depth m bits (where m is a positive integer), the bit depth changing unit 210 may change the bit depth of the second group pixels to n bits (where n is a positive integer satisfying n<m).

Figure 4A:
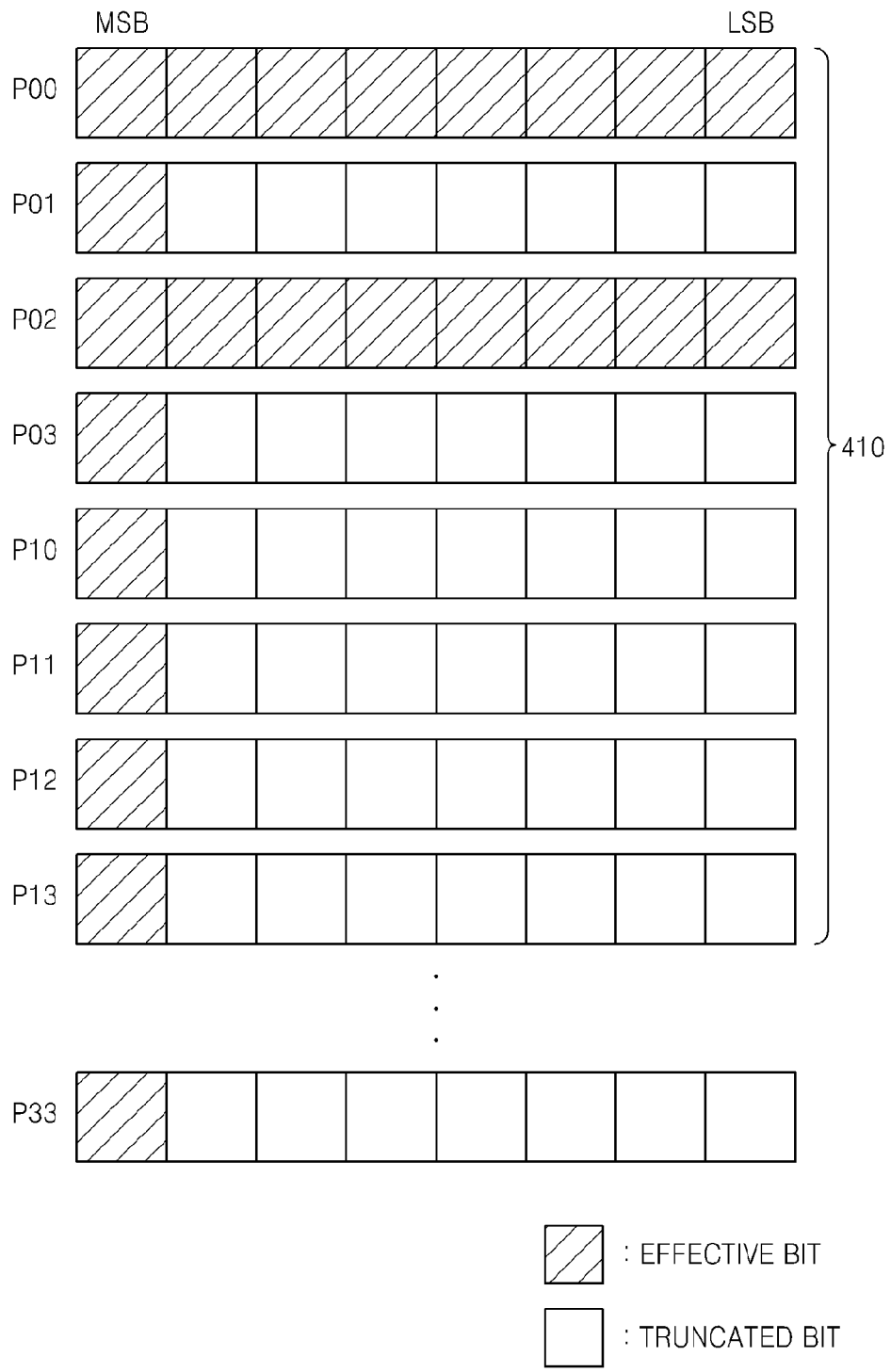
FIGS. 4A through 4C are reference diagrams for describing a method of changing a bit depth of pixel values of pixels selected according to an exemplary embodiment.
Figure 4B:
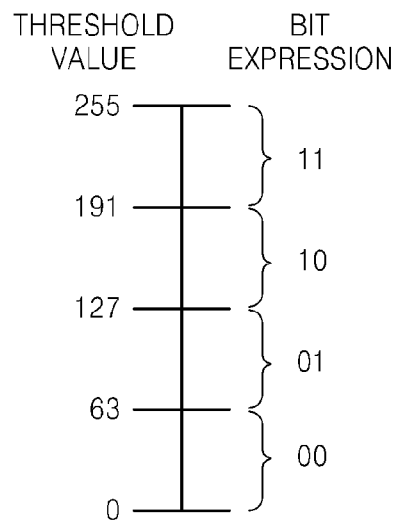
Figure 4C:
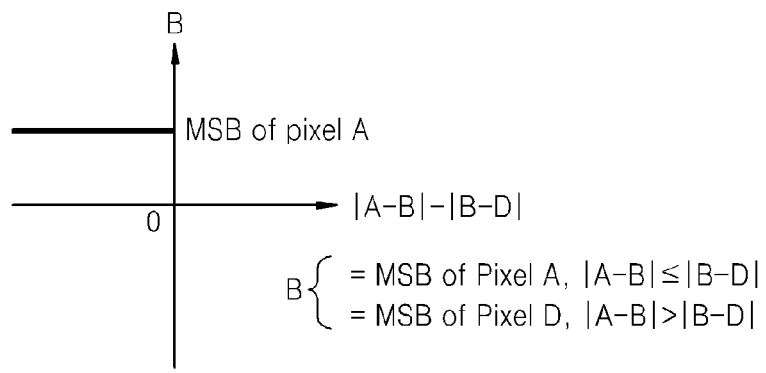

FIGS. 4A through 4C are reference diagrams for describing a method of changing a bit depth of pixel values of pixels selected according to an exemplary embodiment.

Referring to FIG. 4A, when pixels forming an image are classified into a first pixel group of which an original bit depth is maintained and a second pixel group of which a bit depth is changed, the bit depth changing unit 210 may change the bit depth of pixels in the second pixel group via bit truncation of bit values indicating pixel values of the pixels in the second pixel group. For example, as shown in FIG. 3A, if P00, P02, P20, and P22 are in the first pixel group of which the bit depth is maintained at 8 bits, and the remaining pixels are in the second pixel group of which the bit depth is changed to 1 bit, the bit depth changing unit 210 changes the bit depth of pixels in the second pixel group by truncating a predetermined number of bits starting with the least significant bit (LSB). As described above, when the bit depth is changed from 8 bits to 1 bit, the bit depth changing unit 210 changes the bit depth of pixels in the second pixel group by truncating the lower 7 bits in a direction from the LSB to the most significant bit (MSB). As such, the pixels in the second pixel group have pixel information of 1 bit of MSB (i.e., of the "n most significant bits where n=1").

Referring to FIG. 4B, when pixels are classified into first and second pixel groups, the bit depth changing unit 210 may change the bit depth of selected pixels by using a selected threshold value and a bit expression that corresponds to a range of value. In other words, the bit depth changing unit 210 may change the bit depth of the second group pixels via n bit quantization of pixels in the second pixel group using the threshold value, wherein n is a predetermined integer smaller than the bit depth of pixel of an original image. For example, values of an 8 bit pixel expression are classified into 4 ranges or sections as shown in FIG. 4B by using at least one threshold value (in this case, a plurality of threshold values), and the bit depth may be changed by expressing a value that falls within one of the ranges or sections as a bit expression that corresponds to the relevant section.

Referring to FIG. 4C, when pixels are classified into first and second pixel groups, the bit depth changing unit 210 may change the bit depth of selected pixels by using a mathematical transform function. FIG. 4C shows an example of changing the bit depth of selected pixels by using a function that employs a difference value between a pixel for which the bit depth is to be changed, and an adjacent pixel, as a variable. In other words, as shown in FIG. 4C, if a pixel of which a bit depth is to be changed is pixel B, a difference value between the pixel B and a pixel A adjacent to the pixel B is calculated to select a pixel similar to the pixel B, and a bit depth of the pixel B is changed by using the MSB of a bit value of the selected similar pixel. In FIG. 4C, the bit depth of the selected pixel is changed by using one function, but alternatively, the bit depth may be changed by using various other mathematical functions. In other words, the bit depth changing unit 210 may change the bit depth of pixels in the second pixel group by using a mathematical method via a transform function using a similarity or difference between the pixels in the first and second pixel groups as a variable.

Referring back to FIG. 2, the bit depth changing unit 210 transmits the changed input image, in which the bit depth of pixels in the second pixel group is changed, to the motion prediction unit 220.

The motion prediction unit 220 generates a motion vector of the changed input image by performing motion prediction using the changed input image. Any motion prediction algorithm of various methods applied by an image codec, such as H.264, may be used, except that the changed input image, including some pixels of which bit depth has been changed, is used instead of the original input image.

The motion compensation unit 230 performs motion compensation based on the motion vector generated by the motion prediction unit 220. In detail, the motion compensation unit generates a predication image by extracting a corresponding region of a reference image stored in the storage unit 290, wherein the reference image is pre-encoded and restored based on the motion vector.

The subtracting unit 240 generates a residual image constituting a difference value between the input image and the prediction image, and the residual image is (1) transformed and quantized by the transformation and quantization unit 250, (2) entropy-encoded by the entropy encoding unit 260, and (3) output in the form of a bitstream. An image transformed and quantized by the transformation and quantization unit 250 is inverse transformed and inverse quantized by the inverse transformation and inverse quantization unit 270 to become the residual image, and the residual image is added to the prediction image by the adding unit 280, and thus a restored image is generated. The restored image is stored in the storage unit 290 for use in the encoding of a next image frame.

Figure 5:
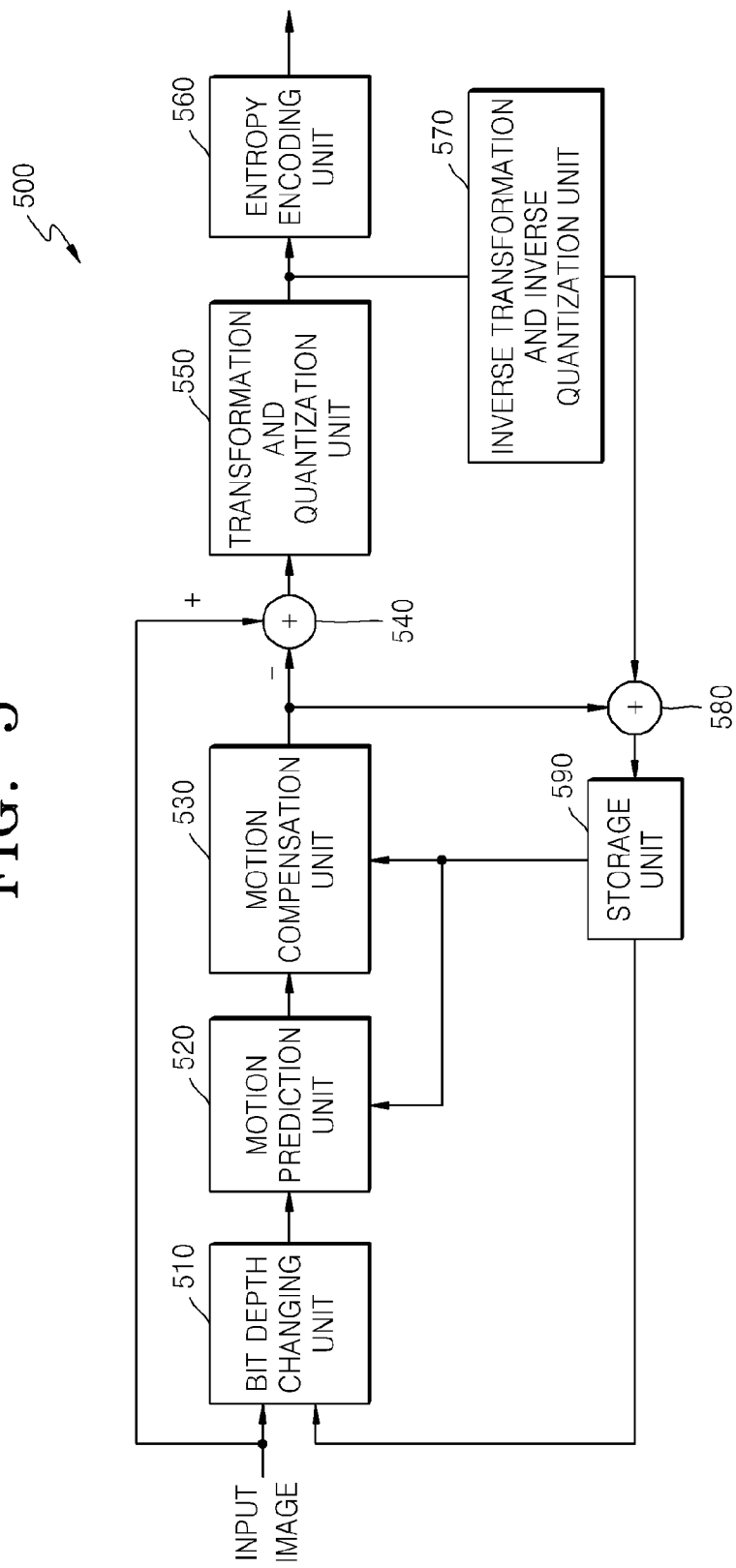
FIG. 5 is a block diagram of an apparatus for encoding an image, according to another exemplary embodiment.

FIG. 5 is a block diagram of an apparatus 500 for encoding an image, according to another exemplary embodiment.

Referring to FIG. 5, the apparatus 500 according to the current embodiment includes a bit depth changing unit 510, a motion prediction unit 520, a motion compensation unit 530, a subtracting unit 540, a transformation and quantization unit 550, an entropy encoding unit 560, an inverse transformation and inverse quantization unit 570, an adding unit 580, and a storage unit 590.

Compared to the apparatus 200, the apparatus 500 changes the bit depth of the pixels of a reference image used for motion prediction and compensation, like the input image in the previous embodiment. In other words, the bit depth changing unit 510 of the apparatus 500 according to the current exemplary embodiment classifies not only the pixels of an input image that is being currently encoded, but also the pixels of a reference image stored in the storage unit 590 by being pre-encoded and restored into first and second pixel groups like the input image according to the previous embodiment, and generates a changed reference image in which the bit depth of only some pixels is changed by changing the bit depth of the pixels in the second pixel group.

The motion prediction unit 520 generates a motion vector by detecting a most similar corresponding region in a search region of the changed reference image, by using a changed input image and the changed reference image. The motion compensation unit 530 generates a prediction image by extracting the corresponding region of the reference image based on the motion vector. Here, the motion compensation unit 530 generates the prediction image by extracting the corresponding region, indicated by the motion vector, by using the original reference image, instead of the changed reference image. Functions of the other elements of the apparatus 500 are identical to those of the apparatus 200, and thus details thereof will not be repeated.

Meanwhile, instead of storing an image as it is, the storage units 290 and 590 of the apparatuses 200 and 500 may compress and store the original image data by storing only difference values between the original pixel values and the adjacent pixel values for some pixels by applying an intra-prediction method.

FIGS. 6A through 6D are reference diagrams for describing methods of storing image data in the storage unit 290 or 590 of FIG. 2 or 5, according to exemplary embodiments.

Figure 6A:
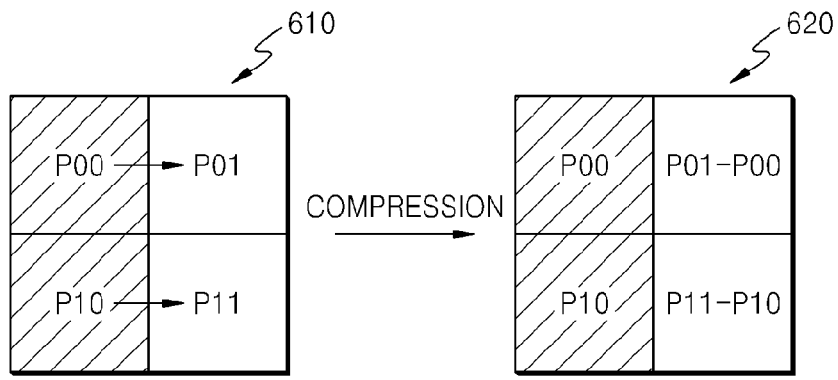
FIGS. 6A through 6D are reference diagrams for describing methods of storing image data in a storage unit of FIG. 2 or 5, according to exemplary embodiments.
Figure 6B:
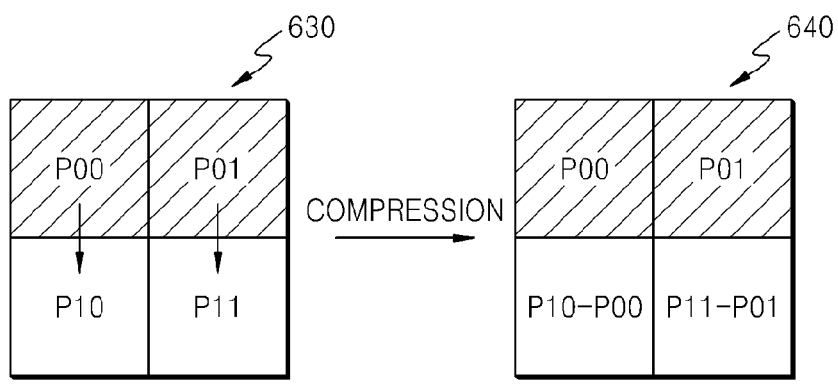
Figure 6C:
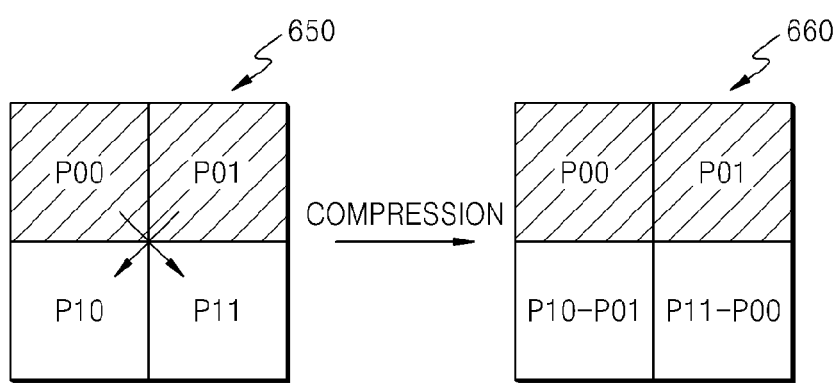
Figure 6D:
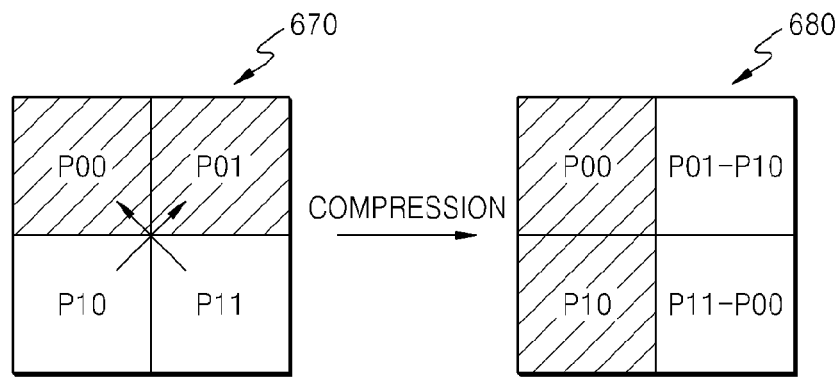

The storage unit 290 or 590 divides a reference image used during encoding of a following image frame, wherein the reference image is pre-encoded and restored, into blocks having a predetermined size. Then, the storage unit 290 or 590 stores a pixel value of at least one pixel selected from among pixels of the divided blocks as they are, and stores, as pixel value information, difference values between the remaining pixels and the selected pixel. Here, the location information, of a pixel value stored as it is, may be expressed as predetermined mode information, as shown in FIGS. 6A through 6D. For example, referring to FIG. 6A, the storage unit 290 or 590 may maintain original pixel values of P00 and P10 from among pixels of a 2×2 block 610 obtained by dividing a reference image, and store the difference values of P01-P00 and P11-P10, which values represent a difference between the other pixels P01 and P11, and left adjacent pixels as pixel value information of P01 and P11. In other words, as shown in FIG. 6A, the storage unit 290 and 590 stores P01-P00 representing the difference between the value of P01 and the value of P00 as the pixel value information of P01, instead of storing the original pixel value of P01 itself. Likewise, the difference in values P11-P10, which represents the difference in value between P11 and P10, may be stored as the pixel value information of P11, instead of the original pixel value of P11. The difference in values between adjacent pixels will typically be a small number, and so takes up less space than the pixel value itself. Similarly, as shown in FIGS. 6B through 6D, the storage unit 290 or 590 (1) stores only difference values between some selected pixels and adjacent pixels by using an intra-prediction method as pixel value information, (2) maintains an original pixel value of a pixel for restoration while reading a stored image later, and (3) pre-sets which pixel values are stored as the difference values as mode information to store the mode information.

Figure 7:
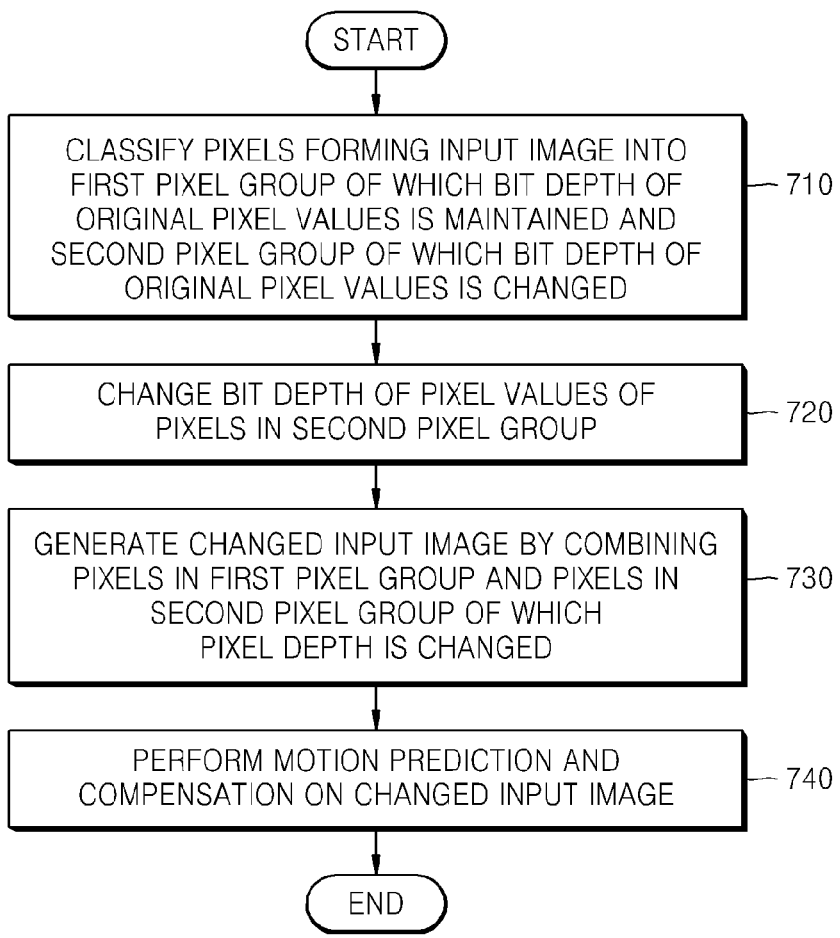
FIG. 7 is a flowchart illustrating a method of encoding an image, according to an exemplary embodiment.

FIG. 7 is a flowchart illustrating a method of encoding an image, according to an exemplary embodiment.

Referring to FIG. 7, the bit depth changing unit 210 classifies pixels forming an input image into a first pixel group of which a bit depth of original pixel values is maintained and a second pixel group of which a bit depth of original pixel values is changed, in operation 710. As described above, the bit depth changing unit 210 may divide the input image into blocks having a predetermined size, and classify pixels at certain locations as the first pixel group and the remaining pixels as the second pixel group. Whether to maintain the bit depth of pixels at the certain locations may be pre-set or changed as occasion demands.

The bit depth changing unit 210 changes the bit depth of pixel values of pixels in the second pixel group, in operation 720. For example, as described above, the bit depth changing unit 210 may change the bit depth of pixels in the second pixel group by truncating a predetermined number of bits beginning with the LSB so that the pixels in the second pixel group have a lower bit depth than the original bit depth.

The bit depth changing unit 210 generates a changed input image by combining the pixels in the first pixel group with the changed pixels in the second pixel group, in operation 730.

The motion prediction unit 220 generates a motion vector by detecting a most similar corresponding region in a search region of a reference image stored in the storage unit 290, by using the changed input image, in operation 740. Also, the motion compensation unit 230 generates a prediction image by extracting the corresponding region of the reference image based on the motion vector. A residual image constituting a difference value between the prediction image and the input image is generated, and the residual image is output in the form of a bitstream via transformation, quantization, and entropy encoding.

Figure 8:
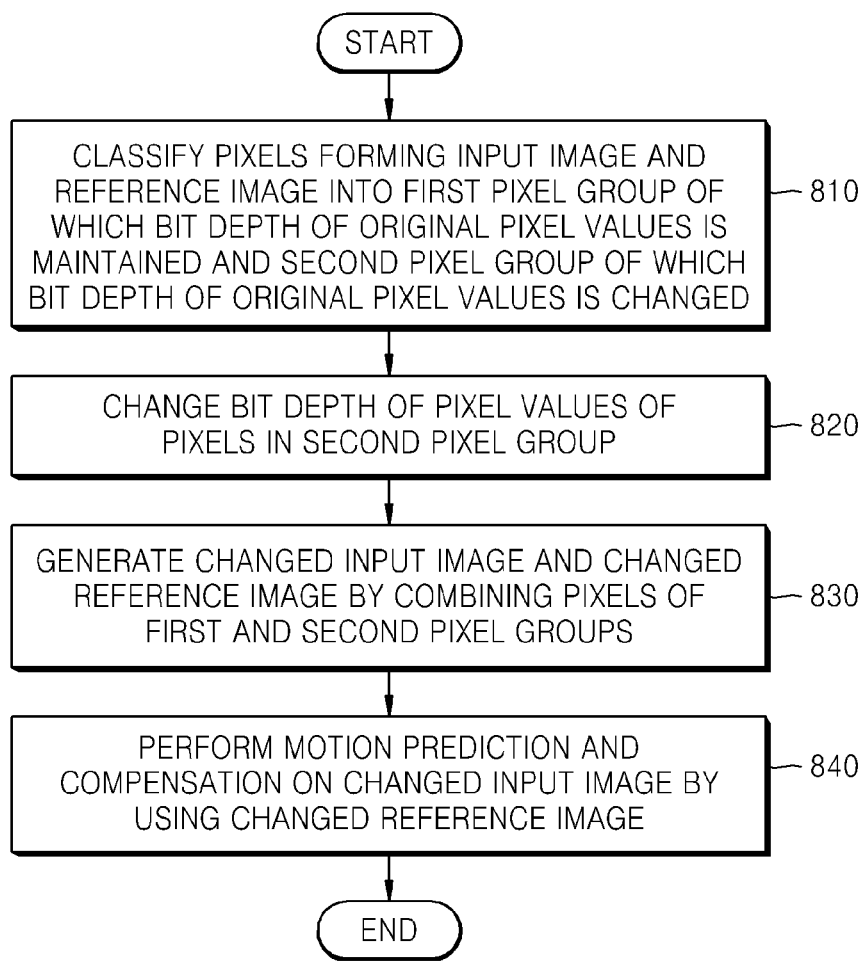
FIG. 8 is a flowchart illustrating a method of encoding an image, according to another exemplary embodiment.

FIG. 8 is a flowchart illustrating a method of encoding an image, according to another exemplary embodiment.

Referring to FIG. 8, the bit depth changing unit 510 classifies pixels forming an input image and a reference image into a first pixel group of which a bit depth of original pixel values is maintained and a second pixel group of which a bit depth of original pixel values is changed, in operation 810.

The bit depth changing unit 510 changes the bit depth of pixel values of pixels in the second pixel group, in operation 820. For example, as described above, the bit depth changing unit 510 may change the bit depth of pixels in the second pixel group by truncating a predetermined number of bits of the original bit values beginning with the LSB so that a bit depth is smaller than an original bit depth.

The bit depth changing unit 510 generates a changed input image and a changed reference image, of which the bit depth of some pixels is changed, by combining the pixels of the first and second pixel groups, in operation 830.

The motion prediction unit 520 generates a motion vector by detecting a most similar corresponding region in a search region of the changed reference image by using the changed input image and changed reference image, in operation 840. Also, the motion compensation unit 530 generates a prediction image by extracting the corresponding region of the reference image based on the motion vector. Here, the motion compensation unit 530 generates the prediction image by extracting the corresponding region indicated by the motion vector by using the original reference image, instead of the changed reference image. A residual image constituting a difference value between the prediction image and the input image is generated, and the residual image is output in the form of a bitstream via transformation, quantization, and entropy encoding.

Figure 9:
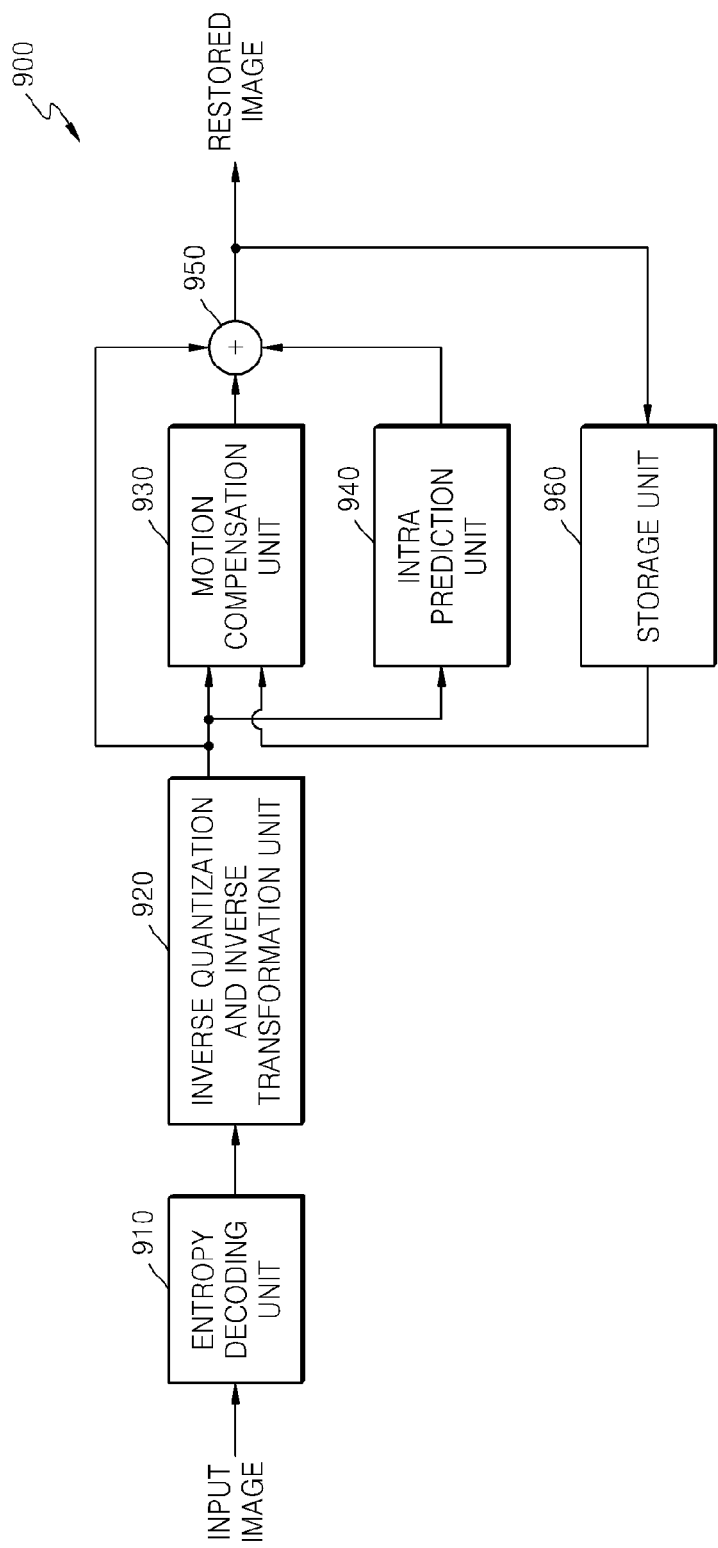
FIG. 9 is a block diagram of an apparatus for decoding an image, according to an exemplary embodiment.

FIG. 9 is a block diagram of an apparatus 900 for decoding an image, according to an exemplary embodiment.

Referring to FIG. 9, the apparatus 900 according to the current embodiment includes an entropy decoding unit 910, an inverse quantization and inverse transformation unit 920, a motion compensation unit 930, an intra-prediction unit 940, an adding unit 950, and a storage unit 960.

An encoded bitstream passes through the entropy decoding unit 910 and the inverse quantization and inverse transformation unit 920, to restore a residual image. Also, an inter-predicted and encoded image passes through the entropy decoding unit 910 to restore the motion vector information. The residual image is restored by being added to a prediction image that is intra-predicted by the intra-prediction unit 940, according to a prediction mode or a prediction image extracted from a reference image stored in the storage unit 960 based on the motion vector of the motion compensation unit 930, by the adding unit 950. The restored residual image is stored in the storage unit 960, and used during decoding of a following image frame.

As described above with reference to FIGS. 6A through 6D, the storage unit 960 of the apparatus 900 may compress and store original image data by storing only the difference values between some pixels and their adjacent pixels in place of the actual pixel value information by applying an intra-prediction method, while storing a pre-restored image. In other words, the storage unit 960 divides a reference image, which is pre-restored and used during decoding of a following image frame, into blocks having a predetermined size. Next, it stores a pixel value of at least one pixel, selected from among the pixels of blocks, as it is (i.e., without modification), and stores only difference values between the remaining pixels and the selected pixel as their pixel value information. Here, the location information for pixel whose value is stored as it is may be expressed by predetermined mode information as shown in FIGS. 6A through 6D.

Figure 10:
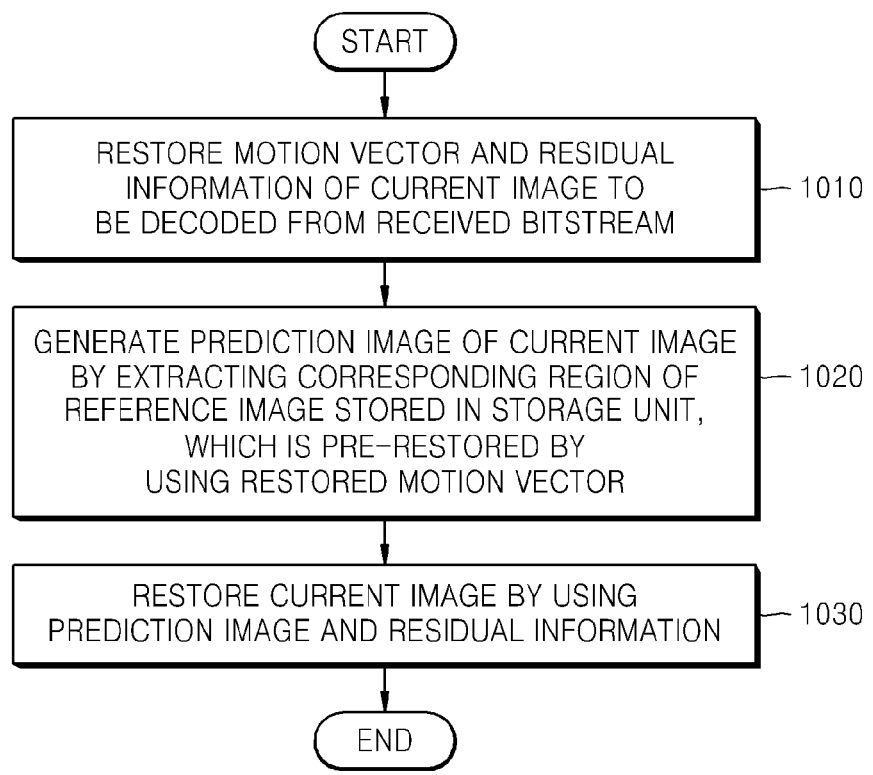
FIG. 10 is a flowchart illustrating a method of decoding an image, according to an exemplary embodiment.

FIG. 10 is a flowchart illustrating a method of decoding an image, according to an exemplary embodiment.

The entropy decoding unit 910 restores a motion vector and residual information of a current image to be decoded from a received bitstream, in operation 1010.

In operation 1020, the motion compensation unit 930 generates a prediction image of the current image by extracting a corresponding region of a reference image stored in the storage unit 960, which is pre-restored by using the restored motion vector. As described above, the storage unit 960 divides the pre-restored reference image into blocks having a predetermined size, stores a pixel value of at least one pixel selected from among pixels of each block, stores difference values between the selected pixel and remaining pixels, and stores location information of the selected pixel, and restores and outputs an original reference image by using the pixel value information and mode information while reading the reference image for motion compensation.

The restored residual information and the prediction image generated by the motion compensation unit 930 are added by the adding unit 950, and thus the current image is restored in operation 1030.

Figure 11:
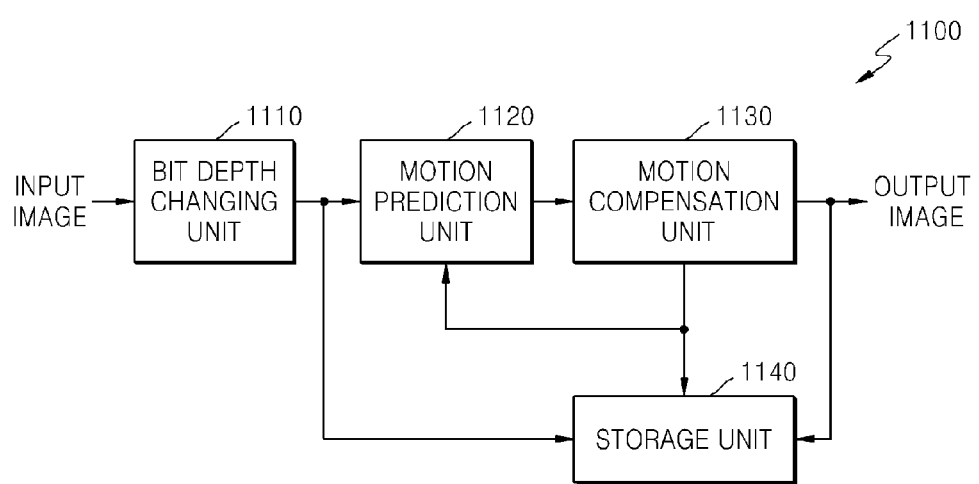
FIG. 11 is a block diagram of an apparatus for processing an image, according to an exemplary embodiment.

FIG. 11 is a block diagram of an apparatus 1100 for processing an image, according to an exemplary embodiment.

Referring to FIG. 11, the apparatus 1100 according to the current embodiment includes a bit depth changing unit 1110, a motion prediction unit 1120, a motion compensation unit 1130, and a storage unit 1140.

The bit depth changing unit 1110 generates a changed input image by changing the bit depth of only some of the pixels from an input image. The changed input image, of which the bit depth of pixels, in a selected pixel group from among the pixels forming the input image, is changed, is input to the motion prediction unit 1120.

The motion prediction unit 1120 generates a motion vector of the changed input image by performing motion prediction on the changed input image.

The motion compensation unit 1130 performs motion compensation based on the motion vector generated by the motion compensation unit 1130. In detail, the motion compensation unit 1130 extracts a corresponding region of a reference image stored in the storage unit 1140 based on the motion vector to generate a prediction image or an interpolated frame via motion compensation.

In FIG. 11, a motion compensated image may be used as an output image without having to use encoding processors of FIG. 2 or 5, such as the subtracting unit 240, the transformation and quantization unit 250, the entropy encoding unit 260, and the inverse transformation and inverse quantization unit 270.

FIG. 12 is a flowchart illustrating a method of processing an image, according to an exemplary embodiment.

Referring to FIG. 12, a pixel group for which the bit depth is to be changed is selected in operation 1210, the bit depth of pixels in the selected pixel group is changed in operation 1220, and the resulting changed input image to be used for motion prediction is generated in operation 1230.

Motion prediction is performed on the changed input image in operation 1240.

In operation 1240, a prediction image or an interpolated frame is generated by using a motion vector generated by performing the motion prediction, and other necessary information.

In operation 1250, a motion compensated image generated via operations 1210 through 1240 is output, and various image processes may be performed on the output motion compensated image.

Thus, a data amount processed during motion prediction and compensation can be reduced since the data amount is reduced while considering characteristics of original image data as much as possible. Also, since the time taken to record and read the data required for motion prediction and compensation is reduced by reducing the data amount, the processing time taken to encode and decode a high resolution image can be reduced. Furthermore, since the data of the reference image used for motion compensation is itself compressed and stored, the memory used to store the data and a data bus used to transmit and receive the data can be more effectively used.

In addition, by preserving more of the information about the original image that would have been lost during an image data process based on the sub sampling as shown in FIG. 1, without affecting resolution of the original image, motion prediction and compensation errors can be reduced, thereby improving the final quality of an image process result using a processed image according to the exemplary embodiments.

The exemplary embodiments can also be embodied as computer readable codes on a non-transitory computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed among network-coupled computer systems so that the computer readable code is stored and executed in a distributed fashion.

While the inventive concept has been particularly shown and described with reference to exemplary embodiments thereof, it will be understood by those of ordinary skill in the art that various changes in form and details may be made therein without departing from the spirit and scope of the following claims.

What is claimed is:

1. A method of encoding an image, the method comprising:
classifying pixels of an input image into a first pixel group in which the bit depth is maintained, and a second pixel group in which the bit depth is changed;
changing the bit depth of the second group pixels;
generating a changed input image by using the pixels in the first pixel group and also the pixels in the second group, of which the bit depth has been changed; and
performing motion prediction and compensation on the changed input image,
wherein the classifying comprises:
dividing the input image into blocks having a predetermined size; and
classifying at least one pixel at a certain location in each block as a member of the first pixel group, and classifying the remaining pixels in each block as members of the second pixel group.

2. The method of claim 1, wherein the changing of the bit depth comprises truncating bits from the pixel values.

3. The method of claim 1, wherein the changing of the bit depth comprises using n bit quantization based on at least one threshold value, where n is an integer smaller than the bit depth of an original pixel.

4. The method of claim 1, wherein the changing of the bit depth comprises using a transform function based on a similarity or difference between the pixels in the first and second pixel groups.

5. The method of claim 1, wherein the performing of the motion prediction and compensation comprises:
generating a motion vector of the input image via motion prediction between a reference image stored in a storage device and the changed input image; and
performing motion compensation, to generate a prediction image of the input image, by reading the reference image indicated by the motion vector from the predetermined storage device,
wherein the reference image is divided into blocks having a predetermined size, stored in the storage device by using at least one pixel value of a pixel selected from among pixels of each block, a difference value between the selected pixel and remaining pixels, and information about a location of the selected pixel.

6. A method of encoding an image, the method comprising:
classifying pixels of an input image and of a reference image into a first pixel group in which the bit depth is maintained, and a second pixel group in which the bit depth is changed;
changing the bit depth of the second group pixels;
generating a changed input image and a changed reference image by using the pixels in the first pixel group and also the pixels in the second pixel group, of which the bit depth has been changed; and
performing motion prediction and compensation on the changed input image by using the changed reference image,
wherein the classifying comprises:
dividing the input image and the reference image into blocks having a predetermined size; and
classifying at least one pixel at a certain location in each block as a member of the first pixel group, and classifying the remaining pixels in each block as members of the second pixel group.

7. The method of claim 6, wherein the changing of the bit depth comprises changing the bit depth of pixel values of pixels in the second pixel group via bit truncation of truncating bits from the pixel values of pixels in the second pixel group.

8. The method of claim 6, wherein the changing of the bit depth comprises changing the bit depth of pixel values of pixels in the second pixel group by using n bit quantization of the pixels in the second pixel group based on a at least one predetermined threshold value, wherein where n is a predetermined an integer smaller than the bit depth of an original pixel.

9. The method of claim 6, wherein the changing of the bit depth comprises changing the bit depth of pixel values of pixels in the second pixel group via using a transform function based on a similarity or difference between the pixels in the first and second pixel groups.

10. The method of claim 6, wherein the performing of the motion prediction and compensation comprises:
generating a motion vector of the changed input image via motion prediction between the changed reference image stored and the changed input image; and
generating a prediction image of the input image by reading from a storage device an original reference image of the changed reference image indicated by the motion vector.

11. The method of claim 10, wherein the original reference image is:
divided into blocks having a predetermined size, and
stored in the predetermined storage device by using:
at least one pixel value of a pixel selected from among pixels of each block,
a difference value between the selected pixel and remaining pixels, and
information about a location of the selected pixel.

12. An apparatus for encoding an image, the apparatus comprising at least one hardware processor which implements:
a bit depth changing unit for classifying pixels of an input image into a first pixel group in which the bit depth is maintained, and a second pixel group in which the bit depth is changed, and changing the bit depth of second group pixels;
a storage unit for storing a reference image used for motion prediction;
a motion prediction unit for generating a motion vector by performing motion prediction by using the reference image and a changed input image generated by combining the pixels in the first pixel group and the pixels in the second pixel group; and
a motion compensation unit for extracting a corresponding region of the reference image based on the motion vector,
wherein the bit depth changing unit divides the input image into blocks having a predetermined size, classifies at least one pixel at a certain location in each block as a member of the first pixel group, and classifies the remaining pixels in each block as members of the second pixel group.

13. An apparatus for encoding an image, the apparatus comprising at least one hardware processor which implements:
 a bit depth changing unit for classifying pixels of an input image and of a reference image into a first pixel group in which the bit depth is maintained, and a second pixel group in which the bit depth is changed, and changing the bit depth of the second group pixels;
 a motion prediction unit for generating a motion vector by performing motion prediction using a changed input image and a changed reference image obtained by combining the pixels in the first pixel group and the pixels in the second pixel group;
 a storage unit for storing the changed reference image and the reference image; and
 a motion compensation unit for extracting a corresponding region of the reference image based on the motion vector,
 wherein the bit depth changing unit divides the input image into blocks having a predetermined size, classifies at least one pixel at a certain location in each block as a member of the first pixel group, and classifies the remaining pixels in each block as members of the second pixel group.

14. An image encoding method, comprising:
 dividing an input image into blocks of pixels having a predetermined size;
 for each of the pixel blocks, selecting at least one pixel at a certain location in each block for output at an unmodified bit depth;
 in each block, reducing the bit depth of the non-selected pixels;
 outputting, as a bitstream, a combination of the identified pixels at the unmodified bit depth and the non-selected pixels at the reduced bit depth.

15. The image encoding method as set forth in claim 14, wherein the selected pixels have the same relative location within each block.

16. The image encoding method as set forth in claim 14, wherein the bit depth of the non-selected pixels is reduced by truncating one or more bits, including a least significant bit.

17. The image encoding method as set forth in claim 14, wherein the bit depth of the non-selected pixels is reduced using n bit quantization based on at least one threshold value, where n is an integer.

* * * * *